United States Patent Office 3,681,146
Patented Aug. 1, 1972

3,681,146
METHOD OF MAKING A FUEL CELL ELECTRODE BY THERMAL DECOMPOSITION
Hideo Baba and Masayoshi Gando, Tokyo, Japan, assignors to Sony Corporation, Tokyo, Japan
Division of application Ser. No. 716,718, Mar. 28, 1968, and a continuation-in-part of application Ser. No. 589,340, Oct. 25, 1966. This application Apr. 16, 1969, Ser. No. 836,186
Int. Cl. H01m 13/04
U.S. Cl. 136—120 FC
5 Claims

ABSTRACT OF THE DISCLOSURE

A fuel cell, a fuel cell electrode useful therein and a method of making such electrode are disclosed. The electrode is composed of a mixture of discrete particles of an electrically conductive material coated with metallic silver and discrete particles of a water-repellant polymer bound together therewith and provided with a metallic mesh embedded within the aforesaid mixture to support the same and provide electrical communicating means for use in a gas diffusion electrode. The electrode is made by coating discrete particles of an electrically conductive material, such as nickel powder or carbon powder, with a silver salt which thermally decomposes to metallic silver with evolution of a gas, such as silver carbonate or silver oxalate; forming a mixture of such coated particles with particles of a water-repellant polymer, such as a fluorocarbon polymer; shaping the so-formed mixture into a formed electrode; and subjecting the so-formed electrode to elevated temperatures sufficient to decompose the silver salt to metallic silver, which uniformly coats the conductive material.

---

This is a continuation-in-part application of copending U.S. Ser. No. 589,340, filed Oct. 25, 1966, now abandoned.

This application is a division of our copending application Ser. No. 716,718, filed Mar. 28, 1968, now abandoned.

The present invention relates to improved fuel cells, and more particularly to fuel cells utilizing an improved fuel cell electrode for operation at low temperatures and a method of making such electrodes.

The aforesaid copending application U.S. Ser. 589,340 (the entirety of which is incorporated herein by reference) generally discloses a fuel cell electrode (and a method of making the same) composed of silver powder and water-repellant polymer particles suitably bonded together and formed so as to be utilized as an electrode in a gas diffusion fuel cell.

The instant invention contemplates improvement in this type of fuel cell electrode whereby a more economical but highly efficient fuel cell electrode for consumer fuel cells and a method for forming the same is produced.

It is therefore an object of the instant invention to provide an economical but highly efficient fuel cell having a novel fuel cell electrode therein.

Another object of the invention is to provide a gas diffusion electrode for a fuel cell which is mechanically rigid and suitable for mass production.

Yet a further object of the instant invention is to provide a gas diffusion electrode which is highly economical and has a long, useful life.

Another object of the invention is to provide a method for the manufacture of the improved electrode of the present invention.

Other objects, features and advantages of the present invention will become apparent to those skilled in the art from the following description taken in conjunction with the accompanying drawings, in which.

Figure 1:
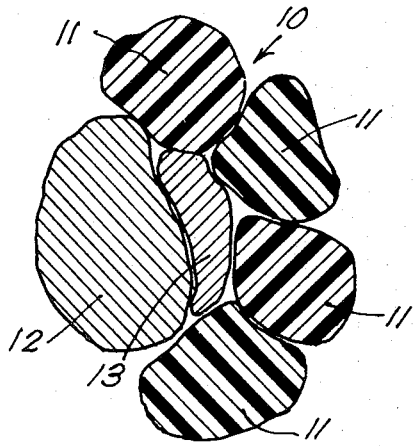
FIG. 1 is a greatly enlarged fragmentary cross-sectional view of an electrode produced in accordance with the aforesaid copending U.S. Ser. 589,340 application.

It is known that a reduction of the amount of silver powder in the composition of known electrode structures, such as disclosed in the aforesaid copending application, result in an increase in electrical resistance of the electrode and that the characteristics of such electrodes are materially deteriorated by such reduction.

It is thought that the deterioration of electrical characteristics in such electrodes, result from insufficient metallic silver obtained from a decomposition of a suitable salt, as such silver must function not only as the catalyzer for the fuel cell reaction but must also function as a conductor between the individual particles within the electrode. To overcome this drawback, it is desirable to disperse either an excess amount of silver into the sintered matrix of the water-repellant polymer or to precipitate metallic silver within such matrix particles in a way to achieve a substantially uniform coating therein to provide sufficient silver surface area to meet all functional demands of metallic silver in fuel cell electrodes.

A preferred method of obtaining a sufficient surface area of silver is to provide precipitated metallic silver from the thermal decomposition of a suitable silver salt, which has been generally uniformly coated onto discrete particles of an electrically conductive material dispersed within the water-repellant polymer making up the matrix of the electrode.

In accordance with the principles of the instant invention, the amount of the silver powder utilized in a fuel cell electrode is reduced approximately 50% from the amount utilized in the aforesaid electrode, without material deterioration of the desired electrode characteristics, and without any undue increase in electrical resistance.

As shown in the drawings:

FIG. 1 is an enlarged cross-sectional view of a formed electrode 10 produced in accordance with the principles of the aforesaid copending application, Electrodes 10 is produced by intermixing particles of nickel 12 with particles of a silver salt, such as silver carbonate, which decomposes to metallic silver particles 13, and with particles of 11 a water-repellent polymer, such as Teflon (polytetrafluoroethylene) and shaping such mixture into a desired form and heating the same to cause the polymer particles to bond (as by sintering or the like) together and allow the silver salt to decompose into relatively thick localized metallic silver particles 13 which are joined and attached to the nickel particles 12 substantially as illustrated at FIG. 1. It is to be noted that the actual surface area of the metallic silver is relatively small and confined to the actual size of the particles 13.

Figure 2:
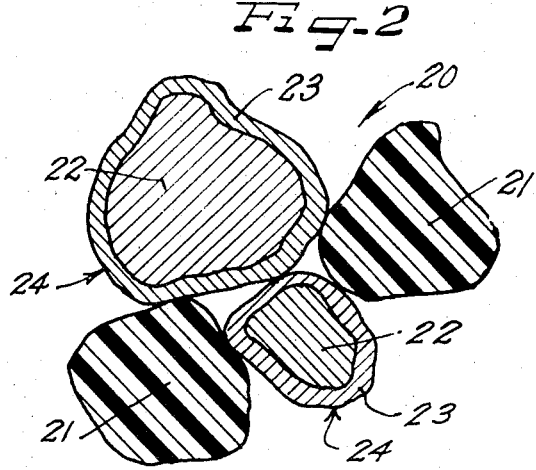
FIG. 2 is a greatly enlarged fragmentary cross-sectional view of an electrode produced according to the instant invention.

In contrast, FIG. 2 illustrates, in greatly enlarged fragmentary cross-sectional view, an electrode 20 produced in accordance with the principles of the instant invention. Electrode 20 is provided with substantially uniformly coated discrete nickel or the like electrically conductive particles 22 having a relatively thin but uniform coating of metallic silver 23, which is obtained from the thermal decomposition of a silver salt to metallic silver with the evolution of a gas; such coated discrete particles 24 are dispersed throughout a matrix of particles 21 of a water-repellant polymer. The finished electrode 20 is thus provided with a plurality of discrete electrically conductive material particles 22 generally uniformly coated with a relatively thin continuous layer of metallic silver 23 interspersed throughout a matrix of bonded together particles of a water-repellant polymer.

It will be noted that the relatively thin continuous layers of metallic silver 23 have a relatively large surface area which completely cover and encompass the electrically conductive particles 22 so tht the electrode 20 is provided with a highly efficient fuel cell catalyst and has extremely good conductivity since the electrically conductive material particles are coated with the relatively thin layer of metallic silver having relatively large surface area. Further, such silver coated electrically conductive particles are adherent to each other through the metallic silver layer thereby enhancing the conductivity thereof and providing a more efficient fuel cell electrode.

The particularly preferred water-repellant polymer for use in the present invention are fluorinated resins. These resins include materials such as polytetrafluoroethylene, fluorinated ethylene-propylene, chlorotrifluoroethylenes and polyvinylidine fluorides, etc. These fluoroplastics do not actually melt, but rather change into a gel at temperatures generally above 412° C.

The fluorinated polymers may be ground to suitable discrete particle size, i.e. 10 mesh, and intermixed with fine particles, i.e. 100 to 300 mesh, of an electrically conductive material which have been previously coated with a suitable silver salt that thermally decomposes into metallic silver with the evolution of a gas, such as for example, silver carbonate or silver oxalate. The mixture is then subjected to elevated temperatures sufficient to decompose the silver salt into metallic silver and then sintered with the fluorinated polymer particles into a matrix that is mechanically rigid to allow ease of handling of the formed electrode. It should be pointed out that the decomposition of the silver salt does not result in the vaporization of the silver so that any type of "migration" of silver might take place, but rather merely results in the evolution of a gas, such as oxygen, leaving metallic silver in substantially the same location where the silver salt was present. Thus, at temperatures of about 100° C. silver carbonate decomposes to yield silver oxide and carbon dioxide and when the temperature reaches about 220° C. under at least partially reducing atmospheric conditions, the silver oxide is further reduced to silver oxide with the evolution of oxygen and finally at temperatures of about 330° C. the silver oxide is reduced to metallic silver with evolution of additional amounts of oxygen. The oxygen is, of course, released into the surrounding atmosphere and causes a multiplicity of fine holes or the like to be formed within the electrode so that an integral but porous structure results.

When an electrode of the type illustrated in FIG. 2 is used in a fuel cell, the electrolyte enters at least partially into the electrode through pores within the polymer matrix and the silver coated electrically conductive particles, but the electrolyte does not leak into the gas contacting side because the polymer particles are water-repellant. On the fuel gas side, the fuel gas enters the electrode through the pores between the polymer particles and the silver coated electrically conductive particles since neither of these particles repel the fuel gas. As a result, there is formed in the electrode an interface of the electrolyte, the fuel cell gas and the silver layers. The interface is electrically connected to a charge collector layer through the electrode and thus supplying electrical charge to an external circuit.

The electrodes of the present invention have a relatively long service life, since they utilize a relatively heat and corrosion resistant resin without using such materials as paraffin, etc. Furthermore, the interface of the electrolyte, fuel gas and silver in the intermediate portion of the electrode is relatively large so that chemical energy can be converted into electrical energy very efficiently. Where the electrode is used as an oxygen electrode, the silver serves not only as a conductive member but also as a catalyst to enhance the activity of the electrode.

In forming an electrode of 6 x 6 x 3 mm., such as described in FIG. 1 and the aforesaid copending application, 7.5 grams of silver carbonate, 2.5 grams of nickel powder and 2.5 grams of Teflon (polytetrafluoroethylene) are necessary to obtain a suitable electrode. However, in forming an identically sized electrode in accordance with the principles of the instant invention and as illustrated at FIG. 2, 4 grams of silver nitrate, 8 grams of nickel powder and 1.2 grams of Teflon (polytetrafluoroethylene) powder are necessary to obtain a similarly suitable electrode. Since 1 gram of silver carbonate and 1 gram of silver nitrate contain respectively 0.5 gram and 0.64 gram of silver, approximately one-half of the amount of silver utilized by the aforesaid known electrode is saved in the electrode formed in accordance with the principles of the instant invention.

Figure 3:
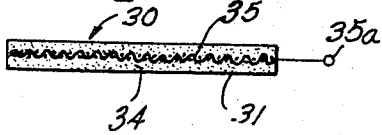
FIG. 3 is a cross-sectional view illustrating one example of an electrode produced according to the present invention.

As shown in FIG. 3, the formed electrode 30 comprises an outer molded layer 31 composed of the silver coated electrically conductive particles dispersed within the matrix of the polymer particles, such as at 34, and provided with an embedded conductive metallic mesh or screen 35 within the formed electrode 30 to act as an electricity collector. The screen or wire mesh 35 is preferably composed of nickel, however, other suitable metals may also be utilized. In addition, the screen 35 is provided with a suitable terminal 35a to facilitate connection with an outside circuit.

Figure 4:
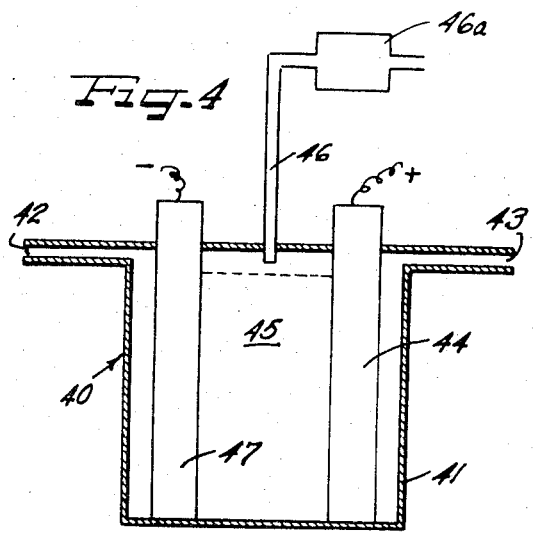
FIG. 4 is a somewhat diagrammatic elevational view of one embodiment of a fuel cell utilizing the electrodes of the instant invention.

FIG. 4 illustrates, in essentially diagrammatic form, a fuel cell 40 which may utilize an electrode of the instant invention, preferably at the anode position. The fuel cell 40 is provided with a suitable housing member 41 having gas inlet passages 42 and 43 for admitting suitable gases, such as hydrogen and oxygen. The fuel cell 40 is also provided with a cathode plate 47, which may be composed of zinc, and an anode plate 44, which is the electrode of the instant invention. The anode and cathode plates are spaced apart a distance and the space therebetween is filled with a suitable electrolyte liquid 45, such as potassium hydroxide, to allow efficient operation of the fuel cell. Above the liquid of the electrolyte 45 there is provided a vent means 46 which may include a gas scrubber means 46a to remove any objectionable gas given off by the fuel cell. The principles of operation of such a fuel cell are well understood and need not be described further.

The following specific examples set forth certain embodiments of the invention to more fully illustrate but not limit the same.

15 grams of acetylene black powder (i.e. fine carbon powder obtained during the condensation of gases in an acetylene torch operation) are dispersed and soaked in a 50 cc. aqueous solution of silver nitrate. The solution is then fully and completely dried at 60° C. so that the silver nitrate substantially uniformly coats all portions and particles of the acetylene black powder. The coated dried powder is then gradually intermixed with a total of about 10 cc. of an aqueous 5 mol. of sodium carbonate solution. Silver carbonate particles are precipitated onto the acetylene black powder by the reaction of the silver nitrate with the sodium carbonate. The silver carbonate particles substantially uniformly coat all of the various particles of the acetylene black powder. After the reaction is fully completed, the supernatant liquid is carefully decanted and the coated acetylene powder carefully washed several times with water. The washed silver carbonate coated acetylene powder is then dried at about 60° C. and ground into fine discrete particles of about 100 to 300 mesh. The ground coated particles are then intermixed with 10 grams of about 10 mesh Teflon powder and the mixture is packed into a pressure mold. A suitably sized nickel screen is placed within the mold to act as a reinforcement means for the powdered mixture and as an electric collector for the formed electrode. The mold is then subjected to a pressure of about 300 kg./cm.$^2$ to form an electrode substantially as illustrated at FIG. 3. The formed electrode is then heated in an electric furnace under vacuum (or at least reduced pressure) conditions. The heating rate is controlled and gradually increased at a rate of about 200° C./hour until a temperature of about 400° C. is achieved. The electrode is heated at this temperature for about 15 to 20 minutes. The heating is then discontinued and the furnace allowed to slowly cool to about 100° C., at which temperature the electrode is removed from the furnace. The so-formed electrode has a porous outer molded layer of conductive particles coated with a metallic silver layer interspaced throughout a matrix of water-repellant polymer particles and a conductive nickel screen therein to reinforce the same and act as a conductor therefor.

Figure 5:
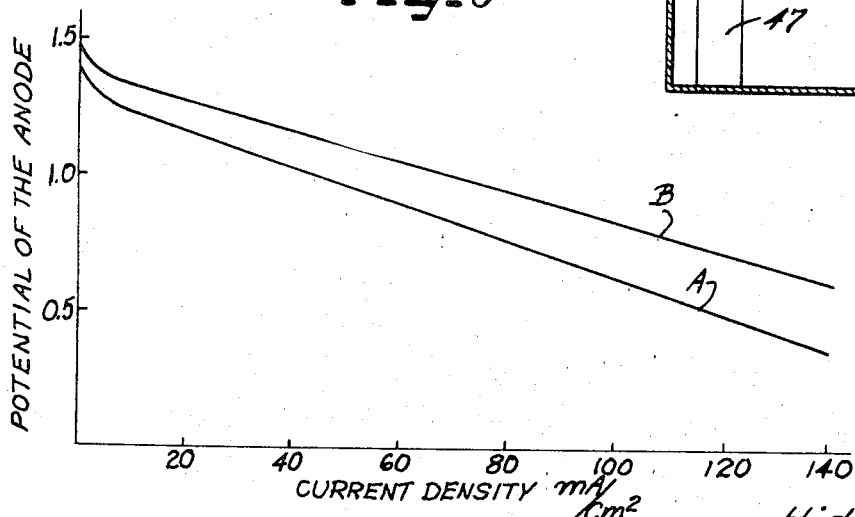
FIG. 5 is a graphical representation of certain characteristics of two different electrode embodiments of the instant invention.

This electrode may then be placed in a suitable fuel cell, somewhat similar to that illustrated and explained at FIG. 5, at the anode position, having one surface exposed to air and the other surface exposed to an electrolyte solution comprising about 5 mol. aqueous solution of potassium hydroxide to ascertain its characteristics. The cathode junction of this fuel cell may be a zinc plate. The anode potential is measured at various current densities. FIG. 5, at curve A illustrates the characteristics of this electrode at the various potentials. These characteristics are substantially the same or identical to the characteristics obtained from an electrode produced in accordance with the aforesaid copending application wherein substantially greater amounts of silver were utilized.

In another example, substantially the same procedure is followed except that 30 grams of 100 to 300 mesh nickel powder is utilized in place of the acetylene black powder. Once the nickel particles are substantially uniformly coated with silver carbonate as set forth above, dried and reground to appropriate size, they are intermixed with about 3 grams of a 10 mesh Teflon powder, pressure packed into a mold and heated as set forth above to produce a formed electrode. This electrode is placed in the anode position of the aforesaid fuel cell and the anode potential is again measured at various current densities. FIG. 4, at curve B illustrates the characteristics of this electrode at the various potentials under the same conditions as used to measure the potential of the electrode utilizing acetylene powder.

As further examples, the procedures and proportions of the aforesaid examples are substantially repeated except that sodium oxalate is used in place of sodium carbonate to produce a silver oxalate layer on the two different electrically conductive materials described in the aforesaid examples. Of course, the silver oxalate is subjected to the elevated temperatures to decompose the same to metallic silver with the evolution of a gas. The characteristics of these electrodes are substantially identical to the previously discussed electrodes.

An examination of curves A and B illustrates that electrodes utilizing nickel powder as the electrically conductive material coated with metallic silver yields superior results, so that it is apparent that nickel powder in a fuel cell electrode produces a more efficient electrode for such fuel cells. However, the economical availability of carbon powder is greater than that of nickel powder, but the weight of an electrode utilizing nickel powder is somewhat lighter than the electrode utilizing carbon powder.

Accordingly, the principles of the instant invention are equally applicable to the utilization of nickel powder, carbon powder or a mixture thereof as desired to take full advantage of the electrically conductive material utilized. In addition, it is also desirable in certain instances, to produce an electrode having two distinct layers, each layer having a substantially greater concentration of a distinct electrically conductive material at one surface thereof than at the other surface. The two layers are, of course, molded intricly together having the metallic mesh electrical conductor therebetween for suitable use in a fuel cell.

It will be apparent to workers skilled in the art that various modifications and variations may be effected in the above described embodiments without departing from the spirit and scope of the claims.

We claim as our invention:

1. A method of producing a fuel cell electrode consisting essentially of (1) substantially uniformly coating discrete fine particles of an electrically conductive material with a silver salt selected from the group consisting of silver carbonate and silver oxalate, (2) intermixing fine discrete particles of water-repellent polymer with the silver salt coated electrically conductive particles and shaping the resultant mixture into a desired configuration, and (3) subjecting the shaped configuration to controlled elevated temperatures sufficient to decompose the silver salt and form metallic silver on the electrically conductive particles.

2. A method of producing a fuel cell electrode consisting essentially of (1) intermixing discrete fine particles of an electrically conductive material with a solution of silver nitrate to generally uniformly coat said particles of electrically conductive material with silver nitrate, (2) intermixing said silver nitrate coated electrically conductive particles with a solution of sodium carbonate to precipitate silver carbonate over said electrically conductive particles, (3) intermixing discrete fine particles of a water-repellant polymer with said silver carbonate coated electrically conductive particles and shaping the resultant mixture into a desired configuration, and (4) subjecting the shaped configuration to controlled elevated temperature conditions sufficient to decompose the silver carbonate and form metallic silver on the electrically conductive particles.

3. A method of producing a fuel cell electrode consisting essentially of (1) intermixing discrete fine particles of an electrically conductive material with a solution of silver nitrate to generally uniformly coat said particles of electrically conductive material with silver nitrate, (2) intermixing said silver nitrate coated electrically conductive particles with a solution of sodium oxalate to precipitate silver oxalate over said electrically conductive particles, (3) intermixing discrete fine particles of a water-repellant polymer with said silver oxalate coated electrically conductive particles and shaping the resultant mixture into a desired configuration, and (4) subjecting the shaped configuration to controlled elevated temperature conditions sufficient to decompose the silver oxalate and form metallic silver on the electrically conductive particles.

4. A method of producing fuel cell electrodes consisting essentially of (1) intermixing discrete fine particles of an electrically conductive material with a solution of silver nitrate so that all of the electrically conductive particles are generally uniformly coated with silver nitrate, (2) removing the silver nitrate coated electrically conductive particles from said silver nitrate solution and subjecting said coated particle to drying conditions below the thermal decomposition temperature of silver nitrate to form dry silver nitrate coated electrically conductive particles, (3) intermixing said dry silver nitrate coated electrically conductive particles with a solution of sodium carbonate so that all of the electrically conductive particles are generally uniformly coated with silver carbonate, (4) removing the silver carbonate coated electrically conductive particles from said sodium carbonate solution and subjecting said coated particles to drying conditions below the thermal decomposition temperature of silver carbonate to form dry silver carbonate coated electrically conductive particles, (5) intermixing discrete fine particles of a water-repellant polymer with said dry silver carbonate coated particles and shaping the resultant mixture into a desired configuration, and (6) subjecting the formed configuration to controlled elevated temperature conditions sufficient to decompose silver carbonate and form metallic silver on the electrically conductive particles.

5. A method as defined in claim 1 wherein the electrically conductive material is selected from the group consisting essentially of nickel, carbon and mixtures thereof.

References Cited

UNITED STATES PATENTS

| | | | |
|---|---|---|---|
| 3,177,077 | 4/1965 | Eyraud et al. | 75—201 |
| 3,341,936 | 9/1967 | Sanstede et al. | 136—86 X |
| 3,409,474 | 11/1968 | Jung et al. | 136—120 |
| 3,553,032 | 1/1971 | Baba et al. | 136—120 FC |

FOREIGN PATENTS

| | | | |
|---|---|---|---|
| 931,732 | 7/1963 | Great Britain | 136—120 |
| 938,708 | 10/1963 | Great Britain | 136—120 |
| 1,401,402 | 4/1965 | France | 136—120 |

WINSTON A. DOUGLAS, Primary Examiner

M. J. ANDREWS, Assistant Examiner